United States Patent Office 2,814,179
Patented Nov. 26, 1957

2,814,179
RETURN BURNING MOTOR

Leonard B. Edelman, Baton Rouge, La., and Clyde F. Miller, Sacramento, Calif., assignors, by mesne assignments, to the United States of America as represented by the Secretary of the Navy Application May 8, 1953, Serial No. 353,868

1 Claim. (Cl. 60—35.6)

This invention relates to rocket motors and more particularly to rocket motors having folded combustion chambers.

Prior art rocket motors are characterized by a number of limitations and disadvantages. For example, the center of gravity shifts considerably as the fuel is used up and a long burning time requires a motor of considerable length. The instant invention overcomes these disadvantages by the use of a folded combustion chamber having two or more concentric fuel cylinders.

Accordingly, one of the objects of the invention is to provide a new and improved rocket motor.

Another object is to provide a new and improved rocket motor having a folded combustion chamber.

Another object is to provide a new and improved rocket motor in which burning begins in the inner chamber and moves progressively from the inner chamber to the outer chamber or chambers.

Another object is to provide a new and improved rocket motor in which changes in the center of gravity resulting from burning of the propellant are reduced to a minimum.

Still another object is to provide a new and improved rocket motor which has optimum fuel burning time for a given length of the rocket motor.

Figure 2:
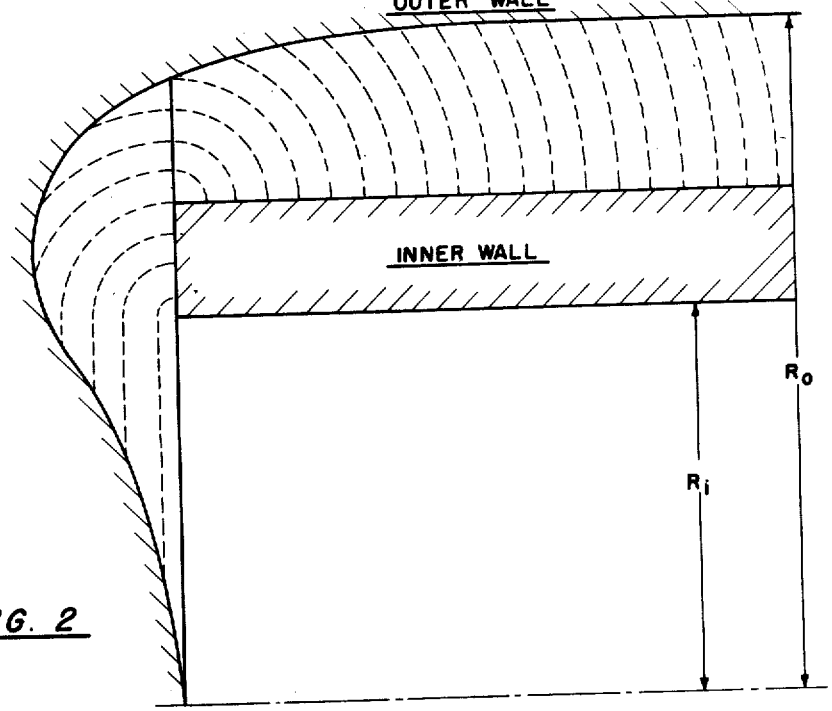
Figure 1:
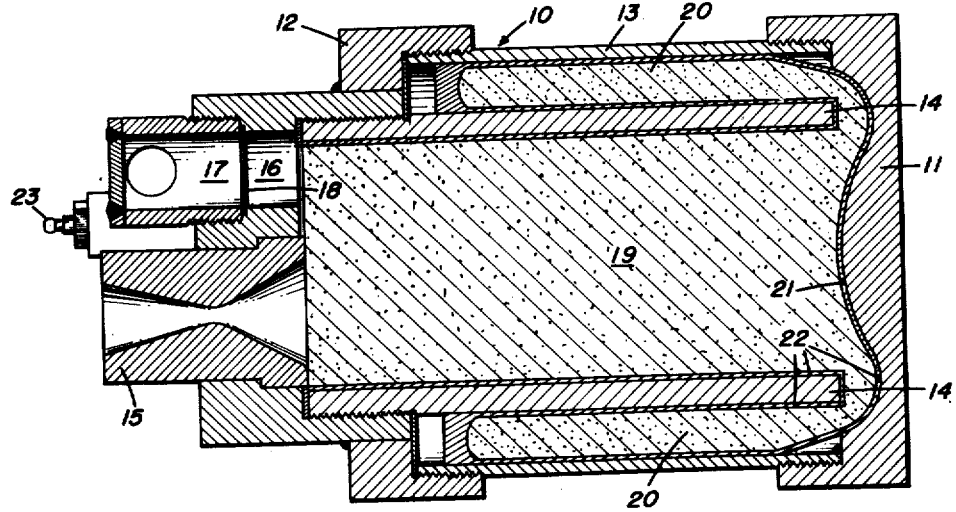

Other objects and advantages will become apparent after a consideration of the following specification when taken in connection with the accompanying drawings, in which:

Fig. 1 is a cross-sectional view of a motor constructed according to the instant invention; and Fig. 2 is a diagram illustrating the operation of the apparatus of Fig. 1.

Referring now to the drawings for a more complete understanding of the invention, the motor generally designated 10, is observed to have a forward end plate 11 and a rearward end plate 12 which are joined by outer shell 13. The end plate 12, which is stepped, supports and covers the rear end of an inner cylinder 14, and is provided with an opening for receiving a suitable nozzle 15. As a safety measure the rear plate member 12 is provided with an opening 16 normally closed by a plug 17 which clamps in place a blowout disk 18.

The inner cylinder 14 which terminates short of the forward plate 11, defines an inner chamber 19; the annular space between the two cylinders 14 and 13 constitutes an outer chamber 20. The two chambers are permitted to communicate by the clearance between the forward end of the cylinder 14 and the front plate 11. The inner surface of the front plate 11 is preferably contoured as indicated by 21 and as shown diagrammatically in Fig. 2 so that the effective area between the adjacent end of the inner cylinder and the inner wall of the front plate 11 approximates the area of the inner combustion chamber 19. Similarly, the annular combustion chamber 20 has an effective area approximately equal to that of the inner combustion chamber.

The two combustion chambers 19 and 20, as well as the space between the cylinder 14 and the front plate 11 are filled with a solid propellant. The surfaces of the combustion chambers 19 and 20 and the confronting face 21 of the front plate 11 are covered with a suitable lining material 22.

The surface of the propellant adjacent to the nozzle 15 is adapted to be ignited by a suitable spark plug 23 or by like ignition means. Upon ignition the surface of the propellant burns forward within the combustion chamber 19, then progresses around the forward end of the cylinder 14, and burns rearward in the outer chamber 20 until exhausted. In Fig. 2 the approximate burning faces of the propellant at different stages as burning proceeds around the cylinder 14 are indicated by broken lines, $R_o$ and $R_i$ representing the radii of the outer and inner walls respectively.

While only one reverse fold is shown, it is understood that if desired more than one fold may be employed to increase the operating time of the motor without increasing its length.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

Rocket motor apparatus of the character described comprising a front plate, a first cylindrical wall extending rearwardly from said front plate, a second cylindrical wall within said first cylindrical wall, said second cylindrical wall extending forwardly from the rear of said rocket motor and terminating to the rear of said front plate, whereby there are formed an annular chamber and a cylindrical chamber inwardly thereof, said annular chamber being closed at its rear end, said chambers being in communication at their front ends adjacent said front plate, a single continuous propellant charge substantially filling said chambers, means to ignite said propellant charger at the rear of said cylindrical chamber and nozzle means at the rear of said cylindrical chamber, whereby said charge will burn from the rear of said cylindrical chamber forwardly, thence, will burn from the front of said annular chamber rearwardly, and all of the products of combustion of said charge will pass through said nozzle means.

References Cited in the file of this patent

UNITED STATES PATENTS

| 1,879,579 | Stolfa et al. | Sept. 27, 1932 |
| 2,400,242 | Malina et al. | May 14, 1946 |

FOREIGN PATENTS

| 5,099 | Great Britain | Dec. 12, 1878 |

UNITED STATES PATENT OFFICE

CERTIFICATE OF CORRECTION

Patent No. 2,814,179                                                     November 26, 1957

Leonard B. Edelman et al

It is hereby certified that error appears in the printed specification of the above numbered patent requiring correction and that the said Letters Patent should read as corrected below.

Column 2, line 48, for "charger" read -- charge --.

Signed and sealed this 5th day of April 1960.

(SEAL)
Attest:

KARL H. AXLINE
Attesting Officer

ROBERT C. WATSON
Commissioner of Patents